United States Patent
Hess et al.

(10) Patent No.: US 7,971,095 B2
(45) Date of Patent: Jun. 28, 2011

(54) FAULT RECOVERY FOR REAL-TIME, MULTI-TASKING COMPUTER SYSTEM

(75) Inventors: Richard Hess, Glendale, AZ (US); Gerald B. Kelly, Glendale, AZ (US); Randy Rogers, Phoenix, AZ (US); Kent A. Stange, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 776 days.

(21) Appl. No.: 11/058,764

(22) Filed: Feb. 16, 2005

(65) Prior Publication Data

US 2006/0195751 A1  Aug. 31, 2006

(51) Int. Cl.
 G06F 11/00 (2006.01)
(52) U.S. Cl. .......................................... 714/15
(58) Field of Classification Search .................. 714/1–52
See application file for complete search history.

(56) References Cited

U.S. PATENT DOCUMENTS

| | | | |
|---|---|---|---|
| 4,345,327 A | 8/1982 | Thuy | |
| 4,453,215 A | 6/1984 | Reid | |
| 4,751,670 A | 6/1988 | Hess | |
| 4,996,687 A * | 2/1991 | Hess et al. | 714/15 |
| 5,086,429 A | 2/1992 | Gray et al. | |
| 5,313,625 A | 5/1994 | Hess et al. | |
| 5,550,736 A | 8/1996 | Hay et al. | |
| 5,732,074 A * | 3/1998 | Spaur et al. | 370/313 |
| 5,757,641 A | 5/1998 | Minto | |
| 5,903,717 A | 5/1999 | Wardrop | |
| 5,909,541 A | 6/1999 | Sampson et al. | |
| 5,915,082 A | 6/1999 | Marshall et al. | |
| 5,949,685 A | 9/1999 | Greenwood et al. | |
| 6,058,491 A | 5/2000 | Bossen et al. | |
| 6,065,135 A | 5/2000 | Marshall et al. | |
| 6,115,829 A | 9/2000 | Slegel et al. | |
| 6,134,673 A | 10/2000 | Chrabaszcz | |
| 6,141,770 A | 10/2000 | Fuchs et al. | |
| 6,163,480 A | 12/2000 | Hess et al. | |
| 6,185,695 B1 | 2/2001 | Murphy et al. | |

(Continued)

FOREIGN PATENT DOCUMENTS

EP  0363863  4/1990

(Continued)

OTHER PUBLICATIONS

Lee, "Design and Evaluation of a Fault-Tolerant Multiprocessor Using Hardware Recovery Blocks", Aug. 1982, pp. 1-19, Publisher: University of Michigan Computing Research Laboratory, Published in: Ann Arbor, MI.

(Continued)

*Primary Examiner* — Scott T Baderman
*Assistant Examiner* — Jigar Patel
(74) *Attorney, Agent, or Firm* — Fogg & Powers LLC

(57) ABSTRACT

System and methods for providing a recoverable real time multi-tasking computer system are disclosed. In one embodiment, a system comprises a real time computing environment, wherein the real time computing environment is adapted to execute one or more applications and wherein each application is time and space partitioned. The system further comprises a fault detection system adapted to detect one or more faults affecting the real time computing environment and a fault recovery system, wherein upon the detection of a fault the fault recovery system is adapted to restore a backup set of state variables.

31 Claims, 6 Drawing Sheets

U.S. PATENT DOCUMENTS

| | | |
|---|---|---|
| 6,189,112 B1 | 2/2001 | Slegel et al. |
| 6,279,119 B1 | 8/2001 | Bissett et al. |
| 6,367,031 B1 | 4/2002 | Yount |
| 6,393,582 B1 | 5/2002 | Klecka et al. |
| 6,467,003 B1 | 10/2002 | Doerenberg et al. |
| 6,560,617 B1 | 5/2003 | Winger et al. |
| 6,574,748 B1 | 6/2003 | Andress et al. |
| 6,600,963 B1 | 7/2003 | Loise et al. |
| 6,625,749 B1 | 9/2003 | Quach |
| 6,751,749 B2 | 6/2004 | Hofstee et al. |
| 6,772,368 B2 | 8/2004 | Dhong et al. |
| 6,789,214 B1 | 9/2004 | De Monis-Hamelin et al. |
| 6,813,527 B2 | 11/2004 | Hess |
| 6,990,320 B2 | 1/2006 | LeCren |
| 7,003,688 B1 | 2/2006 | Pittelkow et al. |
| 7,062,676 B2 | 6/2006 | Shinohara et al. |
| 7,065,672 B2 | 6/2006 | Long et al. |
| 7,178,050 B2 | 2/2007 | Fung et al. |
| 7,320,088 B1 | 1/2008 | Gawali et al. |
| 7,334,154 B2 | 2/2008 | Lorch et al. |
| 7,401,254 B2 | 7/2008 | Davies |
| 2001/0025338 A1* | 9/2001 | Zumkehr et al. ............... 712/228 |
| 2002/0099753 A1* | 7/2002 | Hardin et al. .................... 709/1 |
| 2002/0144177 A1 | 10/2002 | Kondo et al. |
| 2003/0126498 A1 | 7/2003 | Bigbee et al. |
| 2003/0177411 A1 | 9/2003 | Dinker et al. |
| 2003/0208704 A1 | 11/2003 | Bartels et al. |
| 2004/0019771 A1 | 1/2004 | Quach |
| 2004/0098140 A1 | 5/2004 | Hess |
| 2004/0221193 A1 | 11/2004 | Armstrong et al. |
| 2005/0022048 A1 | 1/2005 | Crouch |
| 2005/0138485 A1* | 6/2005 | Osecky et al. .................. 714/48 |
| 2005/0138517 A1 | 6/2005 | Monitzer |
| 2006/0041776 A1* | 2/2006 | Agrawal et al. .................... 714/2 |
| 2006/0085669 A1 | 4/2006 | Rostron et al. |
| 2008/0016386 A1 | 1/2008 | Dror et al. |

FOREIGN PATENT DOCUMENTS

| | | |
|---|---|---|
| EP | 0754990 | 1/1997 |
| EP | 1014237 A1 | 6/2000 |
| EP | 1014237 A1 | 6/2000 |

OTHER PUBLICATIONS

Racine, "Design of a Fault-Tolerant Parallel Processor", 2002, pp. 13.D.2-1-13.D.2-10, Publisher: IEEE, Published in: US.

Dolezal, "Resource Sharing in a Complex Fault-Tolerant System", 1988, pp. 129-136, Publisher: IEEE.

Ku, "Systematic Design of Fault-Tolerant Mutiprocessors With Shared Buses", "IEEE Transactions on Computers", Apr. 1997, pp. 439-455, vol. 46, No. 4, Publisher: IEEE.

* cited by examiner

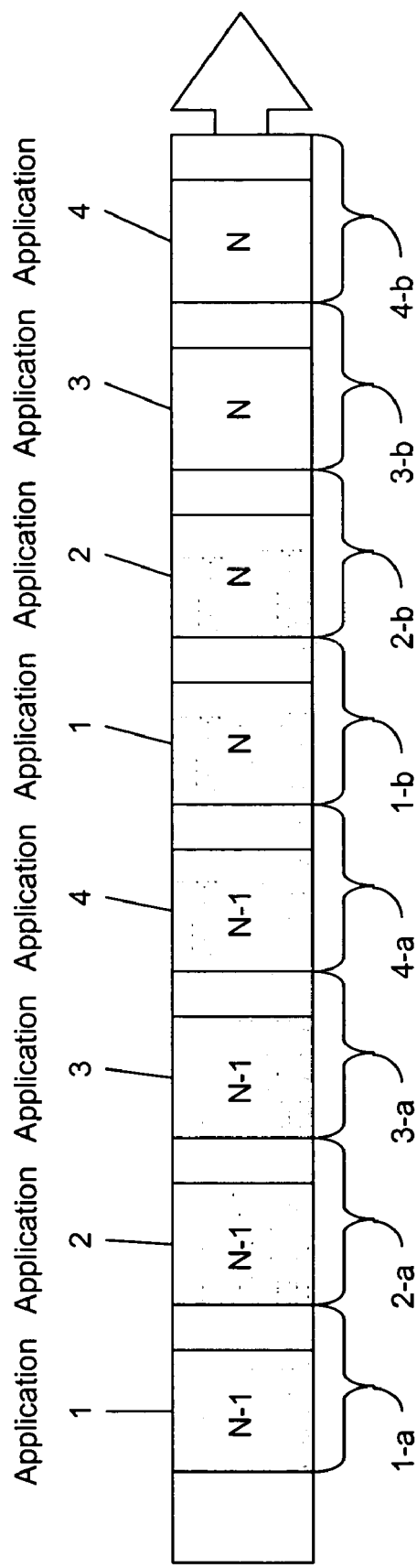

FAULT RECOVERY FOR REAL-TIME, MULTI-TASKING COMPUTER SYSTEM

GOVERNMENT LICENSE RIGHTS

The U.S. Government may have certain rights in the present invention as provided for by the terms of Contract No. NCC-1-393 NASA CRA awarded by NASA.

TECHNICAL FIELD

The present invention generally relates to multi-tasking computer platforms and more specifically to fault detections and recovery for software applications executing in real time multi-tasking environments.

BACKGROUND

The automation of aircraft functions being implemented in avionics systems, specifically flight critical systems, are migrating towards real-time multi-tasking computers. Rather than performing one aircraft function on a single computer, multiple functions, potentially of different criticality significance, are integrated into a single system. Flight critical display functions, but not flight critical control (for example, fly-by-wire) functions, have been implemented using multi-tasking computers. Another trend is that digital electronics built for consumer products are getting continually smaller. As the digital devices become smaller, it takes less energy to corrupt those devices by placing individual bits in an unintended state. Miniaturization has increased the susceptibility of computer electronics and processor hardware elements to various upsets events. Miniaturization has reached the point where atmospheric neutrons now pose a threat for corrupting these devices, as well as intense electromagnetic fields produced by environmental events such as lightning. In the military world, deliberate weapons that create high powered microwave threats are also a concern. Using only commercially available parts to build safety critical systems, it is difficult to design computer hardware which is immune from faults caused by these, as well as other threats.

For the reasons stated above and for other reasons stated below which will become apparent to those skilled in the art upon reading and understanding the specification, there is a need in the art for sufficiently robust systems and methods for executing safety critical applications (such as those implementing fly-by-wire functions) on real-time multi-tasking computers that use commercially available parts.

SUMMARY

The Embodiments of the present invention provide systems and methods for executing safety critical applications on real-time multi-tasking computers and will be understood by reading and studying the following specification.

In one embodiment, a recoverable real time multi-tasking computer system is presented. The system comprises a real time computing platform, wherein the real time computing platform is adapted to execute one or more applications, wherein each application is time and space partitioned. The system further comprises a fault detection system adapted to detect one or more faults affecting the real time computing environment and a fault recovery system, wherein upon the detection of a fault by the fault detection system, the fault recovery system is adapted to restore a backup set of state variables.

In another embodiment, another recoverable real time multi-tasking computer system is presented. The system comprises one or more applications and one or more processors. The one or more processors execute the one or more applications, wherein each application is time and space partitioned. The system further comprises one or more scratchpad memories, wherein the one or more processors store state variables for the one or more applications in the one or more scratchpad memories; one or more fault monitors, the one or more fault monitors adapted to detect one or more system faults occurring during the execution of a first application of the one or more applications; and a fault recovery system adapted to duplicate state variables that are stored in the one or more scratchpad memories. Upon the detection of a fault, the one or more fault monitors is further adapted to notify the fault recovery system, wherein the fault recovery system is further adapted to restore a backup set of state variables into the one or more scratchpad memories. The one or more processors are adapted to resume processing of the first application using the backup set of state variables.

In another embodiment, a method for fault recovery for applications executing on real time multi-tasking computer systems wherein each application is time and space partitioned, is presented. The method comprises duplicating state variables for one or more computational frames; detecting a fault from an upset event within the computational frame in which the upset event occurred; and recovering state variable data duplicated during a computational frame prior to the upset event.

In yet another embodiment, a computer-readable medium having program instructions for a method for fault recovery for applications executing on real time multi-tasking computer systems wherein each application is time and space partitioned is presented. The method comprises duplicating state variables for one or more computational frames; detecting a fault from an upset event within the computational frame in which the upset event occurred; and recovering state variable data duplicated during a computational frame prior to the upset event.

In yet another embodiment, a rapid recovery mechanism for a self-checking lock-step computing lane including two or more processors, two or more scratchpad memories and two or more fault monitors, the self-checking lock-step computing lane adapted to execute one or more applications, wherein each application is time and space partitioned, wherein each application of the one or more applications is executed by the two or more processors during one or more computational frames, wherein the two or more fault monitors are further adapted to detect one or more system faults within the computational frame in which the fault occurred, is presented. The rapid recovery mechanism comprises a first duplicate memory adapted to store state variables duplicated from the one or more scratchpad memories; and a recovery control logic module adapted to receive fault detection signals from the two or more fault monitors. Upon the detection of a fault, the recovery control logic module is adapted to restore a backup set of state variables into the two or more scratchpad memories.

In still another embodiment, another recoverable real time multi-tasking computer system is presented. The system comprises means for executing two or more time and space partitioned software applications; means for detecting one or more faults affecting at least one of the two or more time and space partitioned software applications; and means for restoring a backup set of state variables upon the detection of a fault affecting the at least one of the two or more time and space partitioned software applications.

DRAWINGS

The present invention can be more easily understood and further advantages and uses thereof more readily apparent, when considered in view of the detailed description and the following figures in which:

FIG. 1A is a time line diagram illustrating the real time execution of applications on real-time multi-tasking computers of one embodiment of the present invention;

In accordance with common practice, the various described features are not drawn to scale but are drawn to emphasize features relevant to the present invention. Reference characters denote like elements throughout Figures and text.

DETAILED DESCRIPTION

Figure 1B:
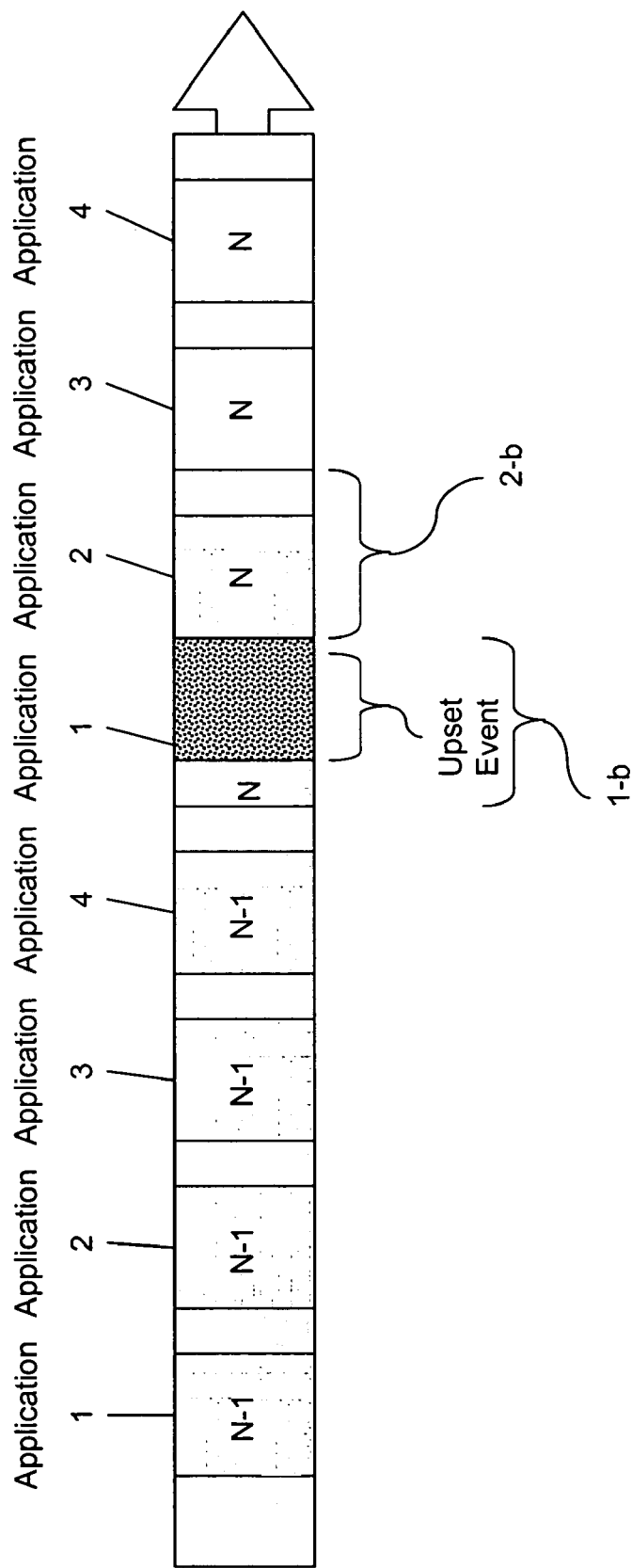
FIG. 1B is a time line diagram illustrating an upset event during the real time execution of applications on real-time multi-tasking computers of one embodiment of the present invention.

Fast fault recovery is important in safety critical systems, such as avionic computer systems, which perform real time computations necessary to control or stabilize dynamic systems, such as aircraft in flight. Embodiments of the present invention increase a computer system's tolerance for faults by providing methods and systems that allow a very fast recovery from system faults.

Embodiments of the present invention have three elements. The first element involves a real time computing environment utilizing time and space partitioning. The second element provides fault detection. The third element provides fault recovery.

Computer systems implementing time and space partitioning are adept at supporting real time computing recovery capabilities. As provided by embodiments of the present invention, time and space partitioning when combined with state variable recovery provides a higher level of computational integrity than either achieves independently Real Time Computing Environment. Embodiments of the present invention employ high integrity computer systems utilizing time and space partitioning which allows hosting of multiple pieces of software on a single piece of hardware. Each piece of software is resident in hardware and can perform a multitude of computational functions including but not limited to operating systems, monitoring systems, and application programs.

Embodiments of the present invention can be used in safety critical applications such as a primary flight control application that must robustly execute in real time. Safety critical applications, such as a primary flight control application, must execute in real time to maintain the stability and control of an aircraft in flight and during landing. Typically, real time systems are designed to control physical devices (e.g. valves, servos, motors, heaters) that require timely processing to perform their designated task correctly. As used in this application, real time execution of applications refers to a computer system performing calculations at the current time based on current parameters. In one embodiment, current parameters include current inputs from sensors. A multi-tasking computer system is a computer system adapted to perform multiple tasks, also known as processes, using shared common processing resources. A multi-tasking computer system is adapted to execute two or more software applications simultaneously by scheduling computer processing resources between the two or more software applications. In one embodiment of the present invention, a multi-tasking computer system is adapted to schedule computer processing resources to support execution of at least one application in real time.

Embodiments of the present invention employ high integrity processing systems utilizing space partitioning. Accordingly, when multiple pieces of software are executed by a single hardware platform, it is problematic if the operation of one piece of software contaminates the operation of another piece of software running on the same platform. Thus when the same hardware platform is used to run both safety critical applications and other applications, care must be taken to prevent the contamination of a safety critical application by any other application.

Computer systems implementing time and space partitioning are adept at supporting real time computing recovery capabilities. Time and space partitioning of processor resources guarantees that one application will not corrupt the memory or execution space of any other application run in computational frames before or after it. No application can corrupt the timeline such that the application would overrun its processing time thus starving out the next application running in the next computational frame. As used in this application, the term computer system includes those elements of an overall system that perform processing or computational functions for the overall system. In one embodiment, the computer system is a subsystem integrated into the overall system.

FIG. 1A illustrates a normal execution timeline in a real time computing environment of one embodiment of the present invention. In the example illustrated in FIG. 1, a single hardware platform is executing multiple applications. The processor cycles through each computational frame, executing applications only within their designate computational frame. For example, the processor executes Application 1 in computational frame 1-*a* in order to perform computations resulting in a set of state variables N. The processor then switches to performing applications 2, 3 and 4 in computational frames 2-*a*, 3-*a* and 4-*a* respectively, each producing their own sets of state variables N. Application 1 is again executed in frame 1-*b* to perform its next frame of computation resulting in the set of state variables N+1. FIG. 1A illustrates a multi-tasking hardware platform utilizing time and space partitioning. That is, each application is executed only during its own computational frame and separately stores state variables relevant to its computations.

FIG. 1B illustrates an upset event occurring during computational frame 1-*b* causing the corruption of Application 1's state variable set N. Because of time and space partitioning, the repercussions of the upset event are limited to affecting Application 1 because the processor will switch to executing Application 2 at the start of computational frame 2-*b*.

Although FIGS. 1A and 1B illustrate time and space partitioning with four applications, one skilled in the art upon reading this specification would appreciate that a computer system executing four applications is only presented as an example and is not a limitation of the present invention. Additionally, it would be understood by one skilled in the art upon reading this specification that software, such as Applications 1 to 4, executing on a computer system with time and space partitioning can include one or more pieces of operating system software, wherein one or more of the state variables illustrated in FIGS. 1A and 1B pertain to the state of the computer system itself. It would also be appreciated by one skilled in the art upon reading this specification that computational frames for one application, such as computational frames 1-a, 1-b and 1-c for Application 1, are not necessarily periodic or equal in time duration as computational frames for another application.

Fault Detection. In one embodiment, lock-step fault detection allows a system to detect upset events almost immediately. One example of lock-step fault detection is provided by the self-checking lock-step computing lane provided in U.S. Pat. No. 5,909,541.

Figure 2:
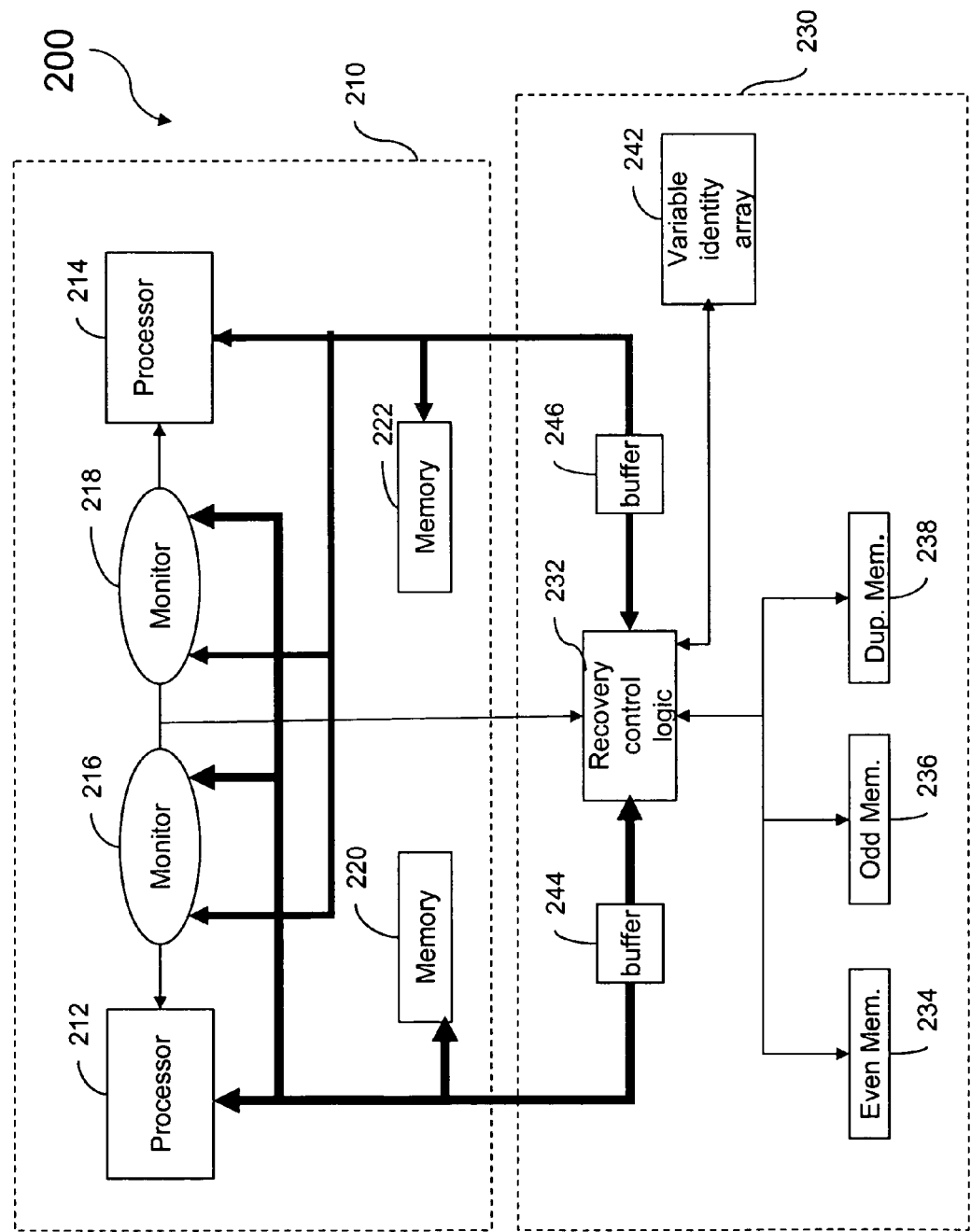
FIG. 2 is a block diagram illustrating a fault recovery system of one embodiment of the present invention.

Traditional lock step processing implies that two or more processors are executing the same instructions at the same time. Self-checking lock-step computing provides the cross feeding of signals from one processing lane to the other processing lane and then comparing them for deviations on every single clock edge. FIG. 2 illustrates one embodiment 200 of a self-checking lock-step computing lane 210 of one embodiment of the present invention. Self-checking lock-step computing lane 210 comprises at least two set of duplicate processors (212 and 214), memories (220 and 222), and fault detection monitors (216 and 218). On every single system clock edge, monitors 216 and 218 both compare the data bus signal and control bus signal output of processors 212 and 214 against each other. When the output signals fail to correlate, monitors 216 and 218 identify a fault. This guarantees that if one processor deviates (e.g. because it retrieves a wrong address or is provided a wrong data bit) one or both of monitors 216 and 218 will detect the fault on the next clock edge. The fault is thus detected in the same computational frame in which it was generated. In one embodiment, when either monitor 216 or monitor 218 detects a fault, the monitor notifies processors 212 and 214. In embodiments of the present invention, upon notification of a fault, processors 212 and 214 shut off further processing of the application which was executing in the faulted computational frame and the fault recovery system is invoked.

Fault Recovery. Fault detection allows the recovery technology of the present invention to restore state variables in the event of an upset. The advantage for avionics systems is that a computer error is not propagated to the pilot level or the airplane motion level, but is detected quickly—within the computational frame in which the error occurred. State variable data is typically the type of data that changes slowly relative to the processing speed of the hardware platform calculating the state variables. By restoring state variables which are only a relatively few computational frames old and restarting the processing element, the resulting computational results will contain only a negligible error due to the upset. In an embodiment where the affected application is a primary flight control application, aircraft response time is not jeopardized because the computations are restarted and recalculated in such a fast fashion.

Figure 1C:
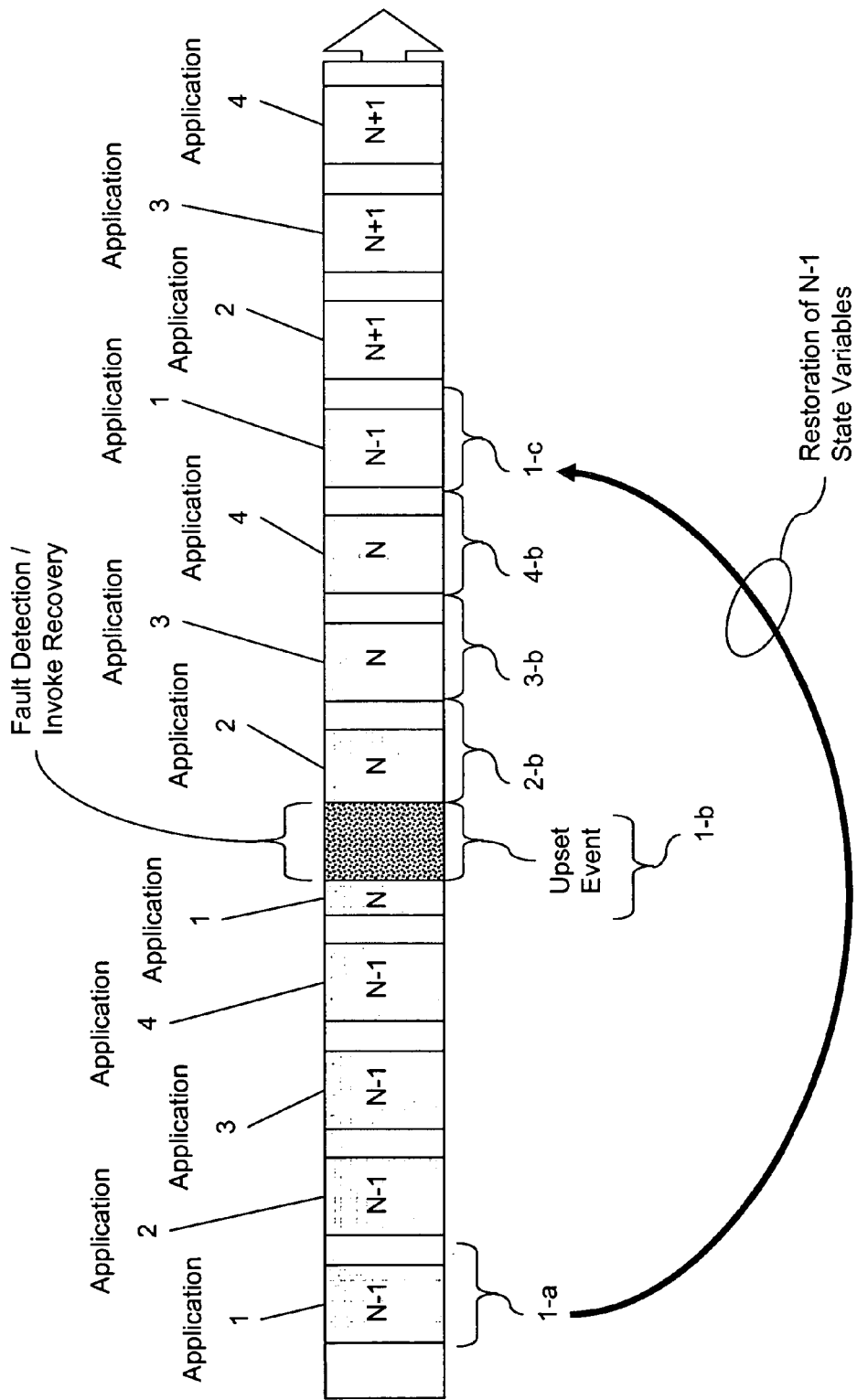
FIG. 1C is a time line diagram illustrating fault detection and state variable recovery of one embodiment of the present invention.

FIG. 1C illustrates the same timeline as FIG. 1B with the addition of fault recovery as provided by embodiments of the present invention. In one embodiment, when a fault detection monitor, such as one of monitors 216 or 218 detects the fault affecting Application 1 during computational frame 1-b, the monitor notifies processors 212 and 214 to shut off processing of Application 1, and notifies recovery control logic 232. Meanwhile, the execution of unaffected Applications 2-4 continue during their assigned computational frames 2-b, 3-b and 4-b. Recovery control logic 232 invokes fault recovery which restores Application 1's state variables as they existed for Application 1 after the computational frame just before the upset event occurred. In the illustration provided in FIG. 1C, the upset event occurs in computational frame 1-b, corrupting Application 1's state variable set N. Fault recovery system 230 restores Application 1's state variables N−1 into memories 220 and 222. Execution of Application 1 then resumes in computational frame 1-c, using the last known uncorrupted set of state variables from frame 1-a. One distinct advantage of this embodiment of the present invention is that fault recovery system 230 only needs to maintain copies of state variable data sets that are one computational frame old.

In operation, in one embodiment, processors 212 and 214 hold state variables for applications in respective memories 220 and 222. The memory locations in memories 220 and 222 used by each application to store state variables as the applications are executed in their respective computational frame are referred to as "scratchpad memories". Fault recovery system 230 creates a duplicate copy of the state variables stored in memories 220 and 222, creating a repository of recent state variable data sets. Fault recovery system 230 stores off the state variables in real time, as processors 212 and 214 are executing and storing the state variables in memories 220 and 222.

In one embodiment, as state variable values are produced by processors 212 and 214 and stored in memories 220 and 222, there is a redundant copy made in duplicate memory 238. In one embodiment, duplicate memory 238 is contained in a highly isolated location to ensure the robustness of the data stored in duplicate memory 238. In one embodiment, duplicate memory 238 is protected from corruption by one or more of a metal enclosure, signal buffers (such as buffers 244 and 246) and power isolation.

In another embodiment, the redundant copy of state variables can be stored on a hardened memory device. As used in this application, a hardened memory device refers to a memory device which is itself inherently immune to corruption due to environmental factors.

In addition to protecting applications against the corruption of state variables, embodiments of the present invention further protect against undesirable consequences from applications that stall during their computational frame, or enter into infinite loops. For example, in one embodiment, if an application executing within its computational frame stalls and never completes its frame, this fault will be detected by one of monitors 216 or 218. In one embodiment, one of monitors 216 or 218 then notifies recovery control logic 232 to initiate a recovery.

One skilled in the art upon reading this specification would recognize that it is undesirable to load duplicate memory 238 with state variable data in situations where the system only partially completed a computing frame when the fault occurred. This is because duplicate memory 238 could end up storing corrupted data for that computing frame. Instead, to ensure that a complete valid frame of state variable data is in the duplicate memory and available for restoration, embodiments of the present invention provide intermediate memories. In one embodiment, a duplicate of memories 220 and 222 for even computational frames is loaded into even frame memory 234. A duplicate of memories 220 and 222 for odd computational frames is loaded into odd frame memory 235. The even frame memory 234 and odd frame memory 236 toggle back and forth copying data into the duplicate memory 238 to ensure that a complete valid backup memory is maintained. Even frame memory 234 and odd frame memory 236 will only copy their contents to duplicate memory 238 if the intermediate memories themselves contain a complete valid state variable backup for a computing frame that successfully completes its execution.

In another embodiment, during the normal computer initialization sequence of computer system 210, duplicate memory 238, even frame memory 234 and odd frame memory 236 are each adapted to copy all state variables written to memories 220 and 222 by processors 212 and 214 in order to set the initial state variables saved in all memories to the same condition. In one embodiment, after initialization the alternating operation of even frame memory 234 and odd frame memory 236 memories begins as described above.

In one embodiment, fault recovery system 230 also includes variable identity array 242 which provides for the efficient use of memory storage. In one embodiment, instead of creating backup copies of every state variable for every application, variable identity array 242 identifies a subset of predefined state variables which allows recovery control logic 232 to backup only those state variables desired for certain applications into duplicate memory 238. In one embodiment, only state variables for predefined applications are included in the predefined subset of state variables that are duplicated into duplicate memory 238. In one embodiment, variable identity array 242 contains predefined state variable locations on an address-by-address basis. In one embodiment, variable identity array 242 allows only the desired state variable data to load into the intermediate memories.

When recovery control logic 232 is notified of a detected fault, recovery control logic 232 retrieves the duplicate state variables for an upset application from duplicate memory 238 and restores those state variables into the upset application's scratchpad memory area of memories 220 and 222. In one embodiment, once the duplicate state variables are restored into memories 220 and 222, recovery control logic 232 notifies monitors 216 and 218 and processors 212 and 214 resume execution of the upset application using the restored state variables.

In another embodiment of the present invention, monitors 216 and 218 are adapted to notify the faulted application of the occurrence of a fault, instead of notifying recovery control logic 232. In operation, in one embodiment, upon detection of a fault affecting an application, the monitor notifies processors 212 and 214 which shut off processing of the upset application. On the upset application's next processing frame, at least one of processors 212 and 214 notify the faulted application of the occurrence of the fault. In one embodiment, upon notification of the fault, the upset application is adapted to request the recovery of state variables by notifying recovery control logic 232. In one embodiment, once the duplicate state variables are restored into memories 220 and 222, recovery control logic 232 notifies monitors 216 and 218 and processors 212 and 214 resume execution of the upset application using the restored state variables.

It would be appreciated by one skilled in the art upon reading this specification that the present invention is not limited only to embodiments with self-checking lock-step computing lanes. In other embodiments the recovery system of the present invention can be adapted to accommodate slower fault detection systems, which may allow several computational frames to elapse before they can identify a fault condition. In those circumstances, the duplicate memory is adapted to hold not only the state variable of the most recent computing frame, but also hold state variable for one or more previous computing frames. In one embodiment, the recovery system is adapted to restore the N-z backup frame state variables to the scratchpad memory when the fault detection system is known to take up to z computation frames to detect a fault.

Figure 3:
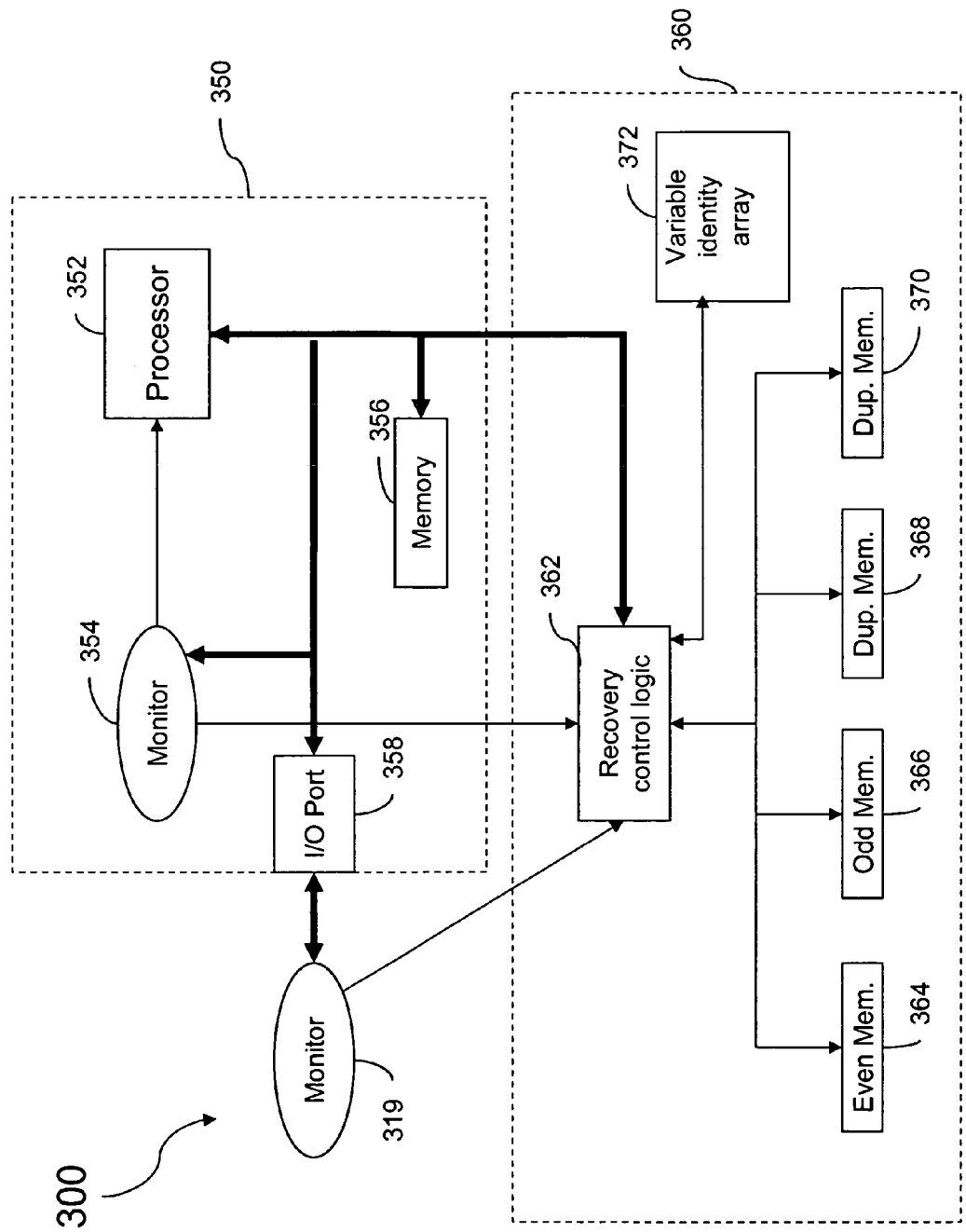
FIG. 3 is a block diagram illustrating another fault recovery system of one embodiment of the present invention.

FIG. 3 illustrates another embodiment of a recoverable computer platform 300 of one embodiment of the present invention. Computer system 350 includes one or more processors 352, memory 356 and fault monitor 354. For state variable values produced by processors 352 and stored in memory 356, there is a redundant copy made in duplicate memory 368. In one embodiment, a duplicate of memory 356 for even computational frames is loaded into even frame memory 364 and a duplicate of memory 356 for odd computational frames is loaded into odd frame memory 366. As described in the embodiment for FIG. 2, even frame memory 364 and odd frame memory 366 toggle back and forth copying data into duplicate memory 368. Thus duplicate memory 368 always contains a backup of state variables for the most recent non-faulted computational frame. In one embodiment, fault recovery mechanism 360 comprises one or more duplicate memories 370, in which are maintained valid state variable data sets for one or more computational frames previous to the most recent computational frame. When recovery control logic 362 is notified of a fault by monitor 354, fault recovery mechanism 360 restores the z'th frame prior state variable data set into memory 356, when monitor 354 is known to take up to z computational frames to detect a fault.

In another embodiment of the present invention, one or more externally located fault detection monitors, such as monitor 319, are adapted to identify one or more faults affecting one or more applications executing on computer system 350 and notify recovery control logic 362 to initiate a fault recovery as described above. In one embodiment, monitor 319 monitors and communicates with computer system 350 via one or more input/output ports 358.

In one embodiment, fault recovery system 360 also includes variable identity array 372 which provides for the efficient use of memory storage. In one embodiment, instead of creating backup copies of every state variable for every application, variable identity array 372 identifies predefined state variable which allows fault recovery mechanism 360 to backup only those state variable desired for certain applications. In one embodiment, variable identity array 372 contains predefined state variable locations on an address by address basis. In one embodiment, variable identity array 372 allows only the desired state variable data to load into the intermediate memories.

Figure 4:
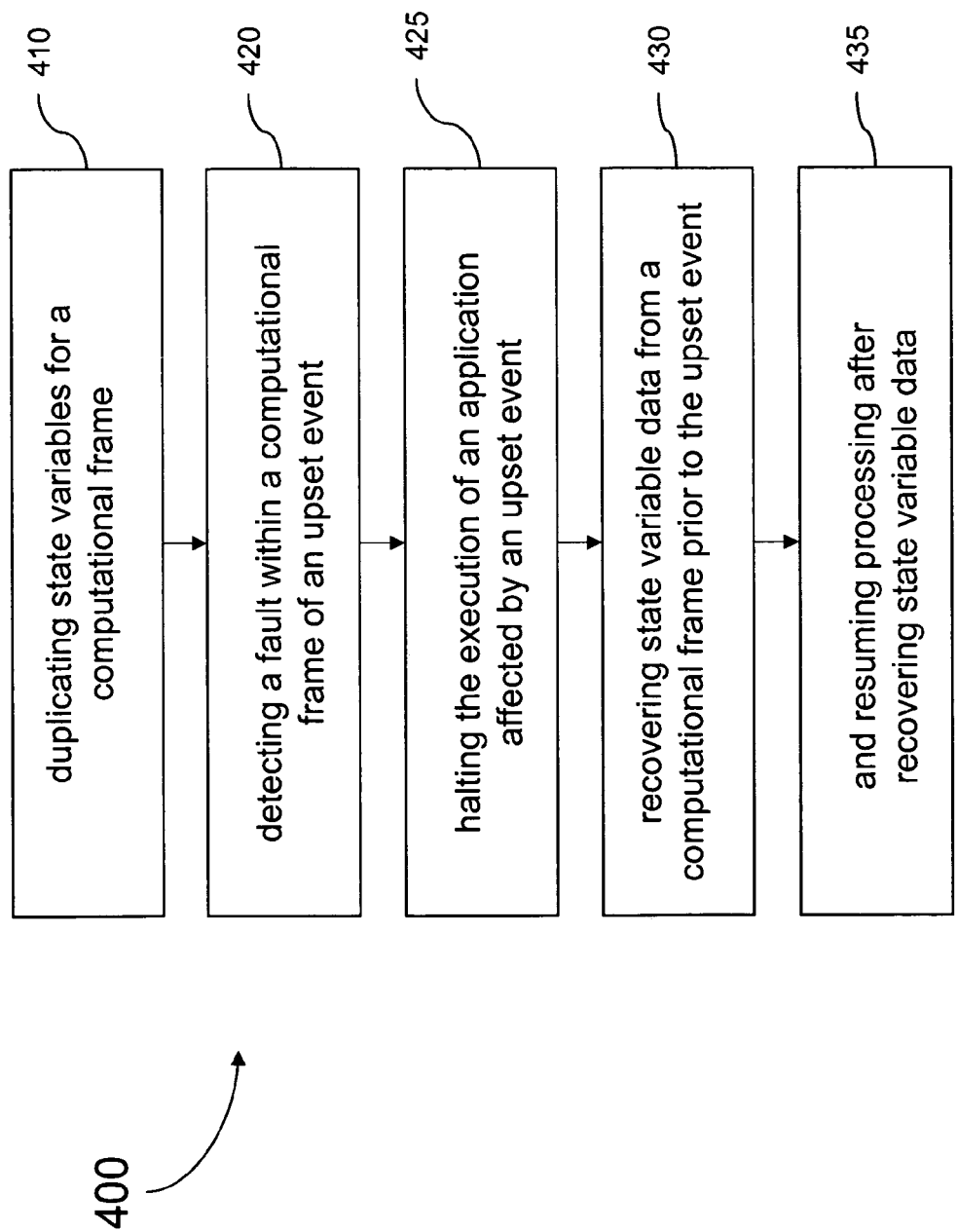
FIG. 4 is a flow diagram illustrating a method of fault recovery of one embodiment of the present invention.

FIG. 4 provides a flow chart illustrating a method 400 of one embodiment of the present invention. The method comprises duplicating state variables for a computational frame (410); detecting a fault within a computational frame of an upset event (420); and recovering state variable data from a computational frame prior to the upset event (430). In other embodiments, the method further comprises halting the execution of an application affected by an upset event (425) and resuming processing after recovering state variable data (435). When processing is restarted, the processor is able to resume calculations at a point very close to where the disruption occurred.

Several means are available to implement the fault recovery systems and methods of the current invention. These means include, but are not limited to, digital computer systems, programmable controllers, or field programmable gate arrays. Therefore other embodiments of the present invention are program instructions resident on computer readable media which when implemented by such controllers, enable the controllers to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Embodiments of the present invention do not preclude other fault detection and recovery methods for a computer system from being utilized.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A recoverable real time multi-tasking computer system comprising:
    a real time avionics computing platform adapted to execute two or more avionics applications simultaneously, wherein each avionics application is time and space partitioned;
    a fault detection system adapted to detect one or more faults affecting the real time avionics computing platform; and
    a fault recovery system, wherein upon the detection of a fault by the fault detection system, the fault recovery system is adapted to restore a duplicate set of state variables, wherein the fault recovery system is further adapted to:
        store, duplicate, and recover only selected state variables from one or more frame times; and
        recover state variables pertaining to any one or more of the avionics applications simultaneously;
    wherein the fault recovery system operates without any involvement from the avionics applications, and
    wherein when a recovery of the one or more avionics applications occurs, the other avionics applications continue to operate without disturbance.

2. The system of claim 1, wherein each application of the two or more avionics applications is executed by the real time avionics computing platform during one or more computational frames, wherein the fault detection system is further adapted to detect the one or more faults.

3. The system of claim 2, wherein the fault recovery system is further adapted to restore the duplicate set of state variables from a computational frame occurring more than one frame before the computational frame in which the fault occurred.

4. The system of claim 3, wherein the fault recovery system is further adapted to restore a duplicate set of state variables from a computational frame occurring one computational frame before the computational frame in which the fault occurred.

5. The system of claim 1, wherein the fault recovery system further comprises:
    a first duplicate memory;
    an even frame memory, wherein the fault recovery system is adapted to duplicate state variables computed by the real time avionics computing platform during even computational frames into the even frame memory; and
    an odd frame memory, wherein the fault recovery system is adapted to duplicate state variables computed by the real time avionics computing platform during odd computational frames into the odd frame memory;
    wherein, the even frame memory and odd frame memory toggle back and forth duplicating state variables into the first duplicate memory for computational frames in which no fault was detected by the fault detection system.

6. The system of claim 5, wherein the even frame memory and odd frame memory are further adapted to not duplicate into the first duplicate memory state variables for computational frames in which a fault was detected by the fault detection system.

7. The system of claim 5, wherein the first duplicate memory, the even frame memory and the odd frame memory are further adapted to duplicate state variables computed by the real time avionics computing platform during initialization of the real time avionics computing platform.

8. The system of claim 5, further comprising:
    a second duplicate memory, wherein the fault recovery system stores duplicate sets of state variables for a plurality of computational frames.

9. The system of claim 5, wherein the first duplicate memory is protected from corruption due to environmental factors by one or more of shielding from a metal enclosure, signal buffers, isolated power supplies and hardened memory.

10. The system of claim 1, the fault recovery system further comprising:
    a variable identity array, adapted to identify a predefined subset of state variables, wherein the fault recovery system duplicates only the subset of state variables.

11. A recoverable real time multi-tasking computer system comprising:
    two or more avionics applications;
    an avionics computing platform comprising one or more processors, the one or more processors executing the two or more avionics applications simultaneously, wherein each application is time and space partitioned;
    one or more scratchpad memories, wherein the one or more processors store state variables for the two or more avionics applications in the one or more scratchpad memories;
    one or more fault monitors, the one or more fault monitors adapted to detect one or more system faults occurring during the execution of a first application of the two or more avionics applications; and
    a fault recovery system adapted to duplicate state variables stored in the one or more scratchpad memories, wherein the fault recovery system is further adapted to:
        store, duplicate, and recover only selected state variables from one or more frame times; and
        recover state variables pertaining to any one or more of the avionics applications simultaneously;
    wherein the fault recovery system operates without any involvement from the avionics applications,
    wherein upon the detection of a fault, the fault recovery system is further adapted to restore a duplicate set of state variables into the one or more scratchpad memories,
    wherein the one or more processors are adapted to resume processing of the first application using the duplicate set of state variables, and
    wherein when a recovery of the one or more avionics applications occurs, the other avionics applications continue to operate without disturbance.

12. The system of claim 11, wherein upon the detection of the fault, the one or more fault monitors are further adapted to notify the fault recovery system.

13. The system of claim 11, wherein upon the detection of the fault, the one or more fault monitors are further adapted to notify a first application affected by the fault, wherein the first application is adapted to notify the fault recovery system.

14. The system of claim 11, wherein each application of the two or more avionics applications is executed by the one or more processors during one or more computational frames, wherein the one or more fault monitors are further adapted to detect one or more system faults within the computational frame in which the fault occurred.

15. The system of claim 14, the fault recovery system further comprising:
a first duplicate memory;
an even frame memory, wherein the fault recovery system is adapted to duplicate state variables stored in the one or more scratchpad memories during even computational frames into the even frame memory; and
an odd frame memory, wherein the fault recovery system is adapted to duplicate state variables stored in the one or more scratchpad memories during odd computational frames into the odd frame memory;
wherein the even frame memory and odd frame memory toggle back and forth duplicating state variables into the first duplicate memory for computational frames in which no fault was detected by the one or more fault monitors.

16. The system of claim 15, further comprising:
a second duplicate memory, wherein the fault recovery system stores duplicate sets of state variables for a plurality of computational frames.

17. A method for fault recovery, the method comprising:
executing a plurality of avionics applications simultaneously on a real time multi-tasking avionics computer system wherein each avionics application is time and space partitioned;
duplicating state variables for one or more computational frames;
detecting a fault from an upset event within the computational frame of one of the applications in which the upset event occurred;
recovering state variable data duplicated during a computational frame prior to the upset event; and
restoring the duplicated state variable data to a computational frame of the one of the applications that occurs immediately after the computational frame in which the upset event occurred, wherein the duplicated state variable data is restored without any involvement from the avionics applications, and wherein during recovery of the one of the applications, the other applications continue to operate without disturbance.

18. The method of claim 17, further comprising:
halting the execution of an application affected by the upset event; and
resuming processing the application affected by the upset event after recovering state variable data.

19. The method of claim 17, wherein duplicating state variables for one or more computational frames further comprises:
duplicating state variables from an even computational frame into a first memory;
duplicating state variables from an odd computational frame into a second memory; and
alternately duplicating state variables from the first memory and the second memory into a third memory.

20. The method of claim 19, wherein recovering state variable data from the computational frame duplicated prior to the upset event further comprises:
duplicating state variables from the third memory into one or more scratchpad memories.

21. A computer-readable medium having program instructions for a method for fault recovery, the method comprising:
executing a plurality of avionics applications simultaneously on a real time multi-tasking avionics computer system wherein each avionics application is time and space partitioned;
duplicating state variables for one or more computational frames;
detecting a fault from an upset event within the computational frame of one of the applications in which the upset event occurred;
recovering state variable data duplicated during a computational frame prior to the upset event; and
restoring the duplicated state variable data to a computational frame of the one of the applications that occurs immediately after the computational frame in which the upset event occurred, wherein the duplicated state variable data is restored without any involvement from the avionics applications, and wherein during recovery of the one of the applications, the other applications continue to operate without disturbance.

22. The computer-readable medium of claim 21, the method further comprising:
halting the execution of an application affected by the upset event; and
resuming processing the application affected by the upset event after recovering state variable data.

23. The computer-readable medium of claim 21, wherein duplicating state variables for one or more computational frames further comprises:
duplicating state variables from an even computational frame into a first memory;
duplicating state variables from an odd computational frame into a second memory; and
alternately duplicating state variables from the first memory and the second memory into a third memory.

24. The computer-readable medium of claim 23, wherein recovering state variable data from the computational frame duplicated prior to the upset event further comprises:
duplicating state variables from the third memory into one or more scratchpad memories.

25. A system comprising:
a self-checking lock-step avionics lane including two or more processors;
two or more scratchpad memories and two or more fault monitors, the self-checking lock-step avionics lane adapted to execute two or more avionics applications simultaneously, wherein each application is time and space partitioned, wherein each application of the two or more avionics applications is executed by the two or more processors during one or more computational frames, wherein the two or more fault monitors are further adapted to detect one or more system faults within the computational frame in which the fault occurred;
a rapid recovery mechanism comprising:
a first duplicate memory adapted to store state variables duplicated from the two or more scratchpad memories; and
a recovery control logic module adapted to receive fault detection signals from the two or more fault monitors;
wherein the rapid recovery mechanism is further adapted to:

store, duplicate, and recover only selected state variables from one or more frame times; and recover state variables pertaining to any one or more of the avionics applications simultaneously;

wherein the rapid recovery mechanism is further adapted to:

store, duplicate, and recover only selected state variables from one or more frame times; and recover state variables pertaining to any one or more of the avionics applications simultaneously;

wherein the rapid recovery mechanism operates without any involvement from the avionics applications, wherein upon the detection of a fault, the recovery control logic module is adapted to restore a duplicate set of state variables into the two or more scratchpad memories, and wherein when a recovery of the one or more avionics applications occurs, the other avionics applications continue to operate without disturbance.

26. The system of claim 25, wherein the recovery control logic module is further adapted to restore a duplicate set of state variables from a computational frame occurring more than one frame before the computational frame in which the fault occurred.

27. The system of claim 26, the rapid recovery mechanism further comprising:

an even frame memory adapted to duplicate state variables stored in the two or more scratchpad memories during even computational frames into the even frame memory; and an odd frame memory adapted to duplicate state variables stored in the two or more scratchpad memories during odd computational frames into the odd frame memory;

wherein the even frame memory and odd frame memory toggle back and forth duplicating state variables into the first duplicate memory for computational frames in which no fault was detected by the two or more fault monitors.

28. The system of claim 27, wherein the even frame memory and odd frame memory are further adapted to discard state variables for computational frames in which a fault was detected by the one or more fault monitors.

29. A recoverable real time multi-tasking computer system comprising:

means for executing two or more time and space partitioned avionics applications simultaneously;

means for detecting one or more faults affecting at least one of the two or more time and space partitioned avionics applications; and means for restoring a duplicate set of selected state variables upon the detection of a fault affecting the at least one of the two or more time and space partitioned avionics applications;

wherein the means for restoring operates without any involvement from the avionics applications, and wherein when a recovery of the one or more avionics applications occurs, the other avionics applications continue to operate without disturbance.

30. The system of claim 29, wherein the means for restoring a duplicate set of state variables further comprises:

a first means for storing state variables;

a second means for storing state variables adapted to duplicate state variables computed during even computational frames; and a third means for storing state variables adapted to duplicate state variables computed during odd computational frames;

wherein the second means for storing state variables and the third means for storing state variables toggle back and forth duplicating state variables into the first means for storing state variables for computational frames in which no fault was detected;

wherein the means for restoring a duplicate set of state variables is further adapted to restore the state variables from the first means for storing state variables.

31. The system of claim 5, wherein the first duplicate memory, the even frame memory, and the odd frame memory are adapted to duplicate state variables computed by a real time operating system of the real time avionics computing platform.

* * * * *

UNITED STATES PATENT AND TRADEMARK OFFICE
CERTIFICATE OF CORRECTION

| | | |
|---|---|---|
| PATENT NO. | : 7,971,095 B2 | Page 1 of 1 |
| APPLICATION NO. | : 11/058764 | |
| DATED | : June 28, 2011 | |
| INVENTOR(S) | : Hess et al. | |

It is certified that error appears in the above-identified patent and that said Letters Patent is hereby corrected as shown below:

On the Title page, item (75) Inventors, replace "Gerald B. Kelly" with --Gerald B. Kelley--

Signed and Sealed this
Fifteenth Day of May, 2012

David J. Kappos
*Director of the United States Patent and Trademark Office*